(12) United States Patent
Bartlett

(10) Patent No.: US 7,046,215 B1
(45) Date of Patent: May 16, 2006

(54) HEAD TRACKER SYSTEM

(75) Inventor: Christopher T Bartlett, Maidstone (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 09/914,838

(22) PCT Filed: Mar. 1, 2000

(86) PCT No.: PCT/GB00/00729

§ 371 (c)(1),
(2), (4) Date: Sep. 25, 2001

(87) PCT Pub. No.: WO00/52563

PCT Pub. Date: Sep. 8, 2000

(30) Foreign Application Priority Data

| Mar. 1, 1999 | (GB) | .................................... 9904669 |
| Jul. 28, 1999 | (GB) | .................................... 9917582 |

(51) Int. Cl.
*G09G 5/00* (2006.01)

(52) U.S. Cl. .............................. 345/8; 345/9; 382/103; 359/630; 359/632

(58) Field of Classification Search ................ 345/7–9; 359/630, 632, 629, 815; 382/103
See application file for complete search history.

(56) References Cited

U.S. PATENT DOCUMENTS

| 4,446,480 A * | 5/1984 | Breglia et al. ............... 348/115 |
| 4,956,794 A * | 9/1990 | Zeevi et al. ................. 702/153 |
| 5,029,220 A * | 7/1991 | Juday ......................... 382/128 |
| 5,424,556 A * | 6/1995 | Symosek et al. ...... 250/559.32 |
| 5,491,510 A * | 2/1996 | Gove ........................... 348/77 |
| 5,684,498 A * | 11/1997 | Welch et al. ................... 345/8 |
| 5,742,263 A * | 4/1998 | Wang et al. .................... 345/8 |
| 5,812,257 A * | 9/1998 | Teitel et al. ............. 356/141.4 |
| 5,850,201 A * | 12/1998 | Lasko-Harvill et al. ........ 345/8 |
| 6,064,749 A * | 5/2000 | Hirota et al. ............... 382/103 |
| 6,369,779 B1 * | 4/2002 | Bartlett ........................... 345/8 |
| 6,377,401 B1 * | 4/2002 | Bartlett ....................... 359/630 |
| 6,424,334 B1 * | 7/2002 | Zimmerman et al. ....... 345/158 |

FOREIGN PATENT DOCUMENTS

| EP | 0 162 713 | 11/1985 |
| EP | 0 209 411 | 1/1987 |
| EP | 0 883 195 | 12/1998 |
| FR | 2 433 760 | 3/1980 |
| GB | 2 300 988 | 11/1996 |
| GB | 2 301 968 | 12/1996 |
| WO | WO 79/00260 | 5/1979 |

* cited by examiner

Primary Examiner—Henry N. Tran
(74) Attorney, Agent, or Firm—Nixon & Vanderhye P.C.

(57) ABSTRACT

A head tracker system for determining a user's head orientation relative to a datum (22) comprises: a head mounting (2) for attachment to the user's head; an optical sensor (12) which in use is located in fixed relation with a known fixed point relative to the head mounting (2) and a plurality of distinguishable markings (18a–18j) each of which when in use is located in fixed relation with a respective known point which is fixed relative to the datum (22). The head tracker further comprises an optical correlator (26) for optically correlating the optical image from the optical sensor (12) with an optical image representative of at least one of said markings (18a–18j); and means (28) for determining the orientation of the head mounting using the output from the optical correlator when it detects that there is correlation between the images.

17 Claims, 2 Drawing Sheets

HEAD TRACKER SYSTEM

This application is the U.S. national phase of international application PCT/GB00/00729, filed in English on 1 Mar. 2000, which designated the U.S. PCT/GB00/00729 claims priority to GB Application No. 9904669.0 filed 1 Mar. 1999 and GB Application No. 9917582.0 filed 28 Jul. 1999. The entire contents of these applications are incorporated herein by reference.

BACKGROUND OF THE INVENTION

1. Field of the Invention

This invention relates to a head tracker system and more especially, although not exclusively, to a head tracker system for use in an aircraft in which the pilot is provided with a helmet-mounted display.

2. Discussion of Prior Art

Head tracker systems are well known and operate to determine a user's head orientation and position relative to a fixed datum. Originally these systems were developed for use in military aviation but have recently found applications in virtual reality systems.

Since the earliest days of military aviation, pilots have not surprisingly preferred to navigate and aim weapons whilst looking up and out of the cockpit. This led to the evolution of the head-up display (HUD) which displays useful symbology which is appropriately referenced to the outside world (often termed "space stabilised"). HUDs typically have a viewing angle of thirty degrees or less and can consequently only be viewed when the pilot is looking in a generally forward direction. To increase the field of regard (that is the total volume of space over which the pilot can view the symbology and includes the pilot moving his head), helmet-mounted displays (HMDs) have evolved which essentially comprise a HUD which is mounted on the pilot's helmet within his field of view. In order that ground stabilized symbols or imagery are presented to the pilot in the correct orientation with respect to the outside world, the symbol generator of the HUD must know in all three axes, that is elevation, azimuth and roll, where the pilot's head is directed. This is achieved by determining (a) the angular orientation of the pilot's head with respect to the aircraft axes and (b) the orientation (attitude) of the aircraft with the outside world. The former requirement has led to the need for a head tracker system. HMDs operate in conjunction with the head tracker system which determines the angular orientation of the user's head with respect to the aircraft axes to ensure that the displayed information is correctly aligned in space or is accurately superimposed against objects in the outside world. For example, in the case of military aviation it is essential that a weapon aiming marker is accurately aligned over the target.

Typically, a head tracker system comprises a head mounting, most commonly a helmet, which is attached to the user's head and a sensor system for determining the angular orientation of the helmet relative to a fixed reference datum. Although strictly speaking a head tracker system actually tracks the orientation of the head mounting and not the user's head, it provides an accurate measure of the user's head orientation provided the head mounting remains in a fixed orientation relative to the user's head.

The reference datum is typically three axes which pass through a known point on the vehicle or airframe. A number of sensor systems have been proposed. For example, early tracking systems used mechanical linkages between the helmet and the vehicle and, whilst such systems were relatively accurate, they were cumbersome, restricted the user's movement and posed particular problems during ejection from an aircraft. Further systems include optical sensor systems in which the helmet carries a number of light emitting diodes operating in the infra-red which are detected by position sensitive detectors which are mounted to the vehicle cockpit. Other known optical systems use visually distinctive physical markings which are detected by a camera. Magnetic sensor systems are also known in which an alternating or pulsed magnetic field is detected by sensors on the helmet. Inertial systems have been proposed which use gyroscopes and accelerometers; and hybrid systems which involve a combination of two or more of the above systems.

A particular requirement of a head tracker system for use in military aviation is high accuracy coupled with a fast dynamic response as the pilot's head movements are often extremely rapid; typically these can be greater than two hundred degrees per second. These two requirements are often mutually exclusive and the known tracker systems are a compromise in achieving these objectives. For example, although inertial systems based on gyroscopes have a very fast dynamic response, the accuracy of these systems is limited by drift over extended periods of operation. Tracker systems which are based on magnetic sensors, although accurate, do not provide a fast enough dynamic response because of the slow settling times of the magnetic fields. Although inherently fast enough, the accuracy of optical systems is constrained by the large amount of electronic processing required. The latency in data processing in most tracker systems is further compounded by the additional lag introduced by the filtering needed to minimise the effect of noise on the often very low levels of signals being detected. In an attempt to overcome these problems it has been proposed to have tracker systems which are hybrid systems and which involve a combination of two of the above systems such as, for example, an inertial system to provide the dynamic response which is supplemented by a magnetic system for long term accuracy.

The present invention has arisen in an endeavour to provide a system which, at least in part, overcomes the limitations of the known head tracker systems.

SUMMARY OF THE INVENTION

According to the present invention a head tracker system for determining a user's head orientation relative to a datum comprises: a head mounting for attachment to the user's head; an optical sensor which in use is located in fixed relation with a known fixed point relative to the head mounting; a plurality of distinguishable markings each of which when in use is located in fixed relation with a respective known point which is fixed relative to the datum; characterised by an optical correlator for optically correlating the optical image from the optical sensor with an optical image representative of at least one of said markings; and means for determining the orientation of the head mounting using the output from the optical correlator when it detects that there is correlation between the images.

It will be appreciated that the location of the distinguishable markings and optical sensor can be interchanged and thus according to a second aspect of the invention a head tracker system for determining a user's head orientation relative to a datum comprises: a head mounting for attachment to the user's head; a plurality of distinguishable markings each of which when in use is located in fixed relation with a respective known point which is fixed relative to the head mounting; an optical sensor which in use is located in fixed relation with a known fixed point relative to the datum; characterised by an optical correlator for optically correlating the optical image from the optical sensor with an optical image representative of at least one of said markings; and means for determining the orientation of the head mounting using the output from the optical correlator when it detects that there is correlation between the images.

Unlike the known tracker systems which use electronic processing (e.g. fast Fourier transforms), the tracker system of the present invention has a fast dynamic response as a substantial part of the processing is carried out optically.

In the context of this patent application the term "marking" is intended to have a broad meaning and includes any symbol, marker, pattern or feature which is physically applied or otherwise generated which defines a spatial and/or angular reference.

The distinguishable markings can comprise a spatial pattern such as, for example, a cross, circle, diamond, triangle or other simple pattern. To assist in discriminating between the presence of markings and the rest of the optical image the distinguishable markings can additionally be defined in part at least by their colour. The only requirement of the marking is that it is unambiguously recognisable and in one embodiment it is envisaged that the plurality of markings comprises features of the environment around the user, said features being fixed relative to the datum such as for example a part of the cockpit structure or instrumentation in the case of an aircraft. In such a system the optical correlator optically correlates the optical image from the optical sensor with optical images representative of the environment around the user. To increase the visibility of the markings it is preferred for them to be defined using a retroreflective material.

Alternatively the head tracker further comprises one or more marking generators for generating the markings. With such a generator/s the colour of marking is conveniently defined by the wavelength of light produced by each marking generator. To reduce the visual impact the markings may have on the user it is preferred to select the wavelength of the light to be in a non-visible part of the electromagnetic spectrum, most conveniently in the infra red region.

In one embodiment each visual marking is a collimated image having an axis which is predetermined and which passes through said respective known fixed point. When using such markings the optical sensor is preferably focussed at infinity such that the markings are only visible when the axis of the field of view of the optical sensor and the axis of the marking are substantially coincident. To provide an accurate measure of the head mounting orientation in such a system a large number of markings are required. As an alternative, or in addition, additional sensors such as accelerators or gyroscopes can be mounted to the head mounting to measure the relative change of its orientation to the known orientations determined from the markings.

For markings which are not in the form of collimated images the means for determining the orientation of the head mounting is further operable to determine where within the field of view of the optical sensor a marking is located.

In a preferred implementation the optical sensor comprises a video camera, such as a charge coupled device (CCD), for capturing the optical image and converting it to an electrical signal. When using a video camera or other optical sensor which produces an electrical output the tracker further comprises means for converting the electrical signal back to an optical image. Such an arrangement enables the optical correlator to be mounted remotely from the head mounting. To further increase the accuracy of the system a second optical sensor is provided at a second known fixed point relative to the head mounting or fixed datum.

Preferably the optical correlator is a Vander Lugt or joint transform type correlator and the means for converting the electrical signal back to an optical image comprises one of the spatial light modulators of the optical correlator. Advantageously the optical correlator is operable to sequentially optically correlate the optical image from the optical sensor with an optical image representative of each of the markings or optical images representative of the environment around the user. As an alternative, or in addition, further optical correlators can be provided each of which is dedicated to detecting one or more of the markings.

According to a further aspect of the invention a head tracker system for determining a user's head orientation relative to a datum comprises: a head mounting for attachment to the user's head; characterised by an optical sensor which in use is located at a known point fixed relative to the head mounting and operable to collect optical scene data representative of the user's environment; an optical correlator for correlating said optical scene data with optical scene data previously captured by said optical sensor to determine the relative movement of the head mounting between the capture of said optical scene data; and means for determining the orientation of the head mounting from said relative movements.

In accordance with a particularly preferred embodiment for use in an aircraft, said environment comprises at least a part of the cockpit such as the instrumentation. To further assist in the optical correlation process and to provide a method of determining an absolute measure of the orientation of the head mounting relative to the datum it is preferred to provide one or more distinguishable markings at respective known points which are fixed relative to the datum.

BRIEF DESCRIPTION OF THE DRAWINGS

A head tracker system in accordance with the invention will now be described by way of example only with reference to the accompanying drawings in which.

DETAILED DISCUSSION OF EMBODIMENTS

Figure 1:
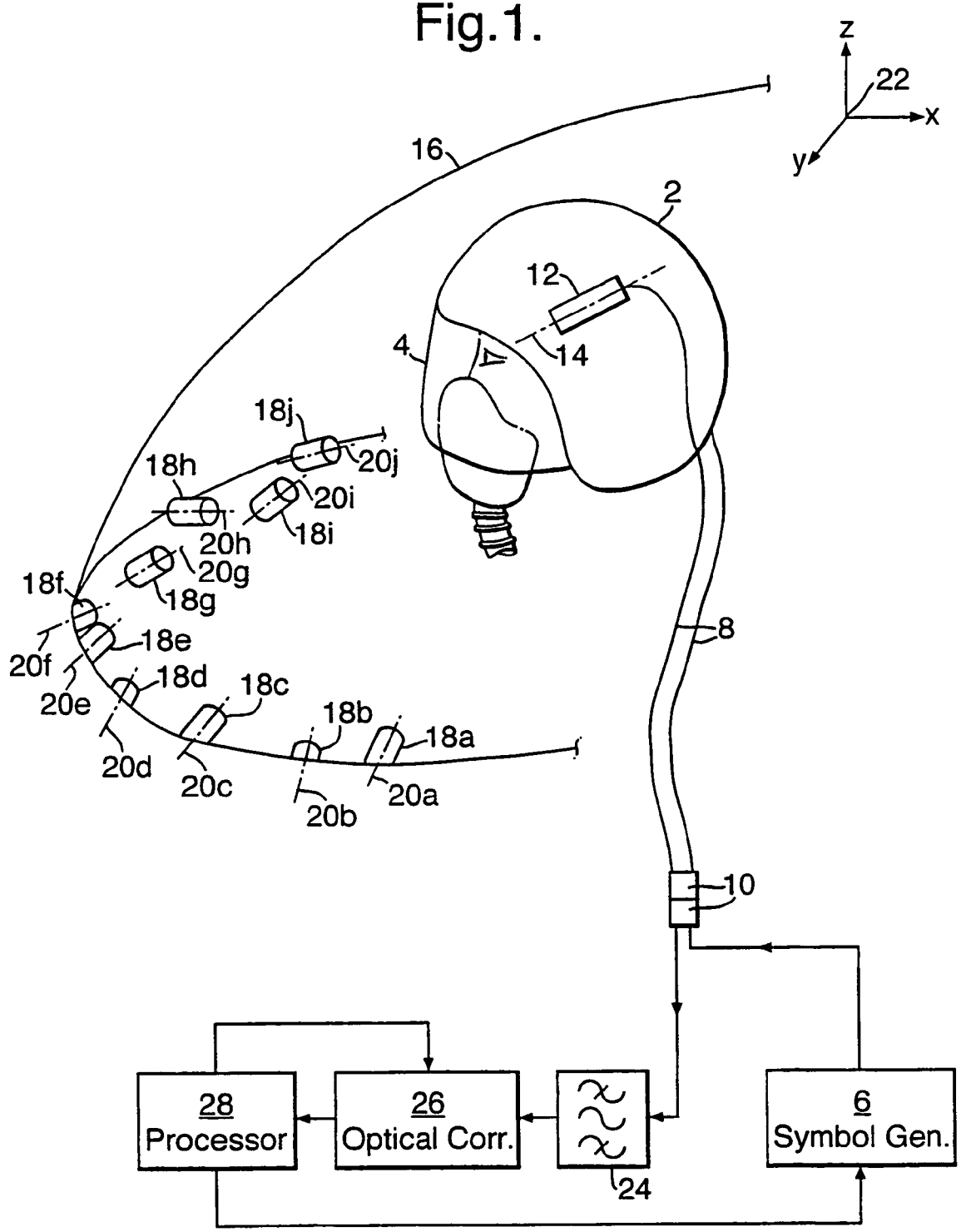
FIG. 1 is a schematic representation of a head tracker system in accordance with the invention.

Referring to FIG. 1 there is shown a head tracker system for use in a fixed wing aircraft which comprises a helmet 2 which constitutes a head mounting for attachment to a pilot's head. In a known manner the helmet 2 is provided with a visor 4 and internally the helmet is provided with a helmet mounted display (HMD) device (not shown) which is arranged to project a display onto a partially reflective inner surface of the visor 4 so that the display is superimposed upon at least a part of the view seen by the pilot through the visor 4. In an alternative arrangement the HMD device can project a display onto discrete eye pieces which are located within the line of sight of the pilot. As is known the symbology displayed on the HMD generated by a symbol generator 6 which is located within the aircraft. The symbology is appropriately referenced in dependence on the user's head orientation which is determined by a processor 28 which is described below. The signals used to drive the HMD are passed to the helmet along an umbilical cord 8 which is provided with a quick release connector arrangement 10 fixed inside the cockpit.

A miniature charged coupled device (CCD) colour video camera 12 is rigidly mounted to the helmet 2. The axis 14 of the field of view of the video camera is accurately aligned to a set reference axis within the helmet 2. The camera 12 is focussed at infinity (in the context of the present invention infinity, in practical terms, corresponds to four meters or more) or slightly less to compensate for any effect the canopy windshield 16 may have. The resolution of the camera is of VGA standard, that is six hundred and forty five by four hundred and eighty pixels.

Mounted around the cockpit at fixed known locations are a number of marking generators 18a to 18j (for clarity only ten are represented in FIG. 1). Each marking generator 18, which comprises a light emitting diode and collimator, produces a collimated beam of light of a pre-selected wavelength containing a symbol or pattern which is unique to the generator and which is accurately aligned with a respective known axis 20. For example 18a produces a circle, 18b produces a cross, 18c produces a diamond and so forth. In the embodiment described this wavelength is selected to be within a visible part of the electromagnetic spectrum though in an alternative embodiment the wavelength can be selected to be within a non-visible part of the spectrum such as the infra red region. The advantage of the latter is that the marking generators are less likely to distract the pilot when they are operational. As described each marking generator 18 produces its own unique distinguishable marking which is accurately aligned along a predetermined axis 20 which passes through a point which is accurately known relative to a set fixed reference datum (x,y,z) 22. As will be appreciated the marking can be any form of distinguishable marking and the only requirement is that the generator can be unambiguously identified from the spatial pattern it generates. Thus, each generator 18 produces a unique distinguishable symbol or pattern indicative of a known position and orientation.

As will now be described, the marking generators 18a–j, in conjunction with the camera 12, are used to determine the position and orientation of the helmet 2 relative to the aircraft reference datum 22.

The video signal from the camera 12 is passed down the umbilical cord 8 and applied via a wavelength selective filter 24 to one input of an optical correlator 26 which processes the information to identify when one of the markings passes through the field of view of the camera 12. The wavelength selective filter 24 is used to discriminate any marking from the rest of the video image of the scene. The operation of the optical correlator 26 is described below. When the optical correlator 26 detects and identifies which marking has passed through the camera's field of view the system knows that the camera 12 and hence the helmet 2 were oriented in a known direction when that video frame was captured. From this information the position of the helmet 2 can be determined by a processor 28 and the movement of the pilot's head relative to the reference datum 22 determined and tracked.

Figure 2:
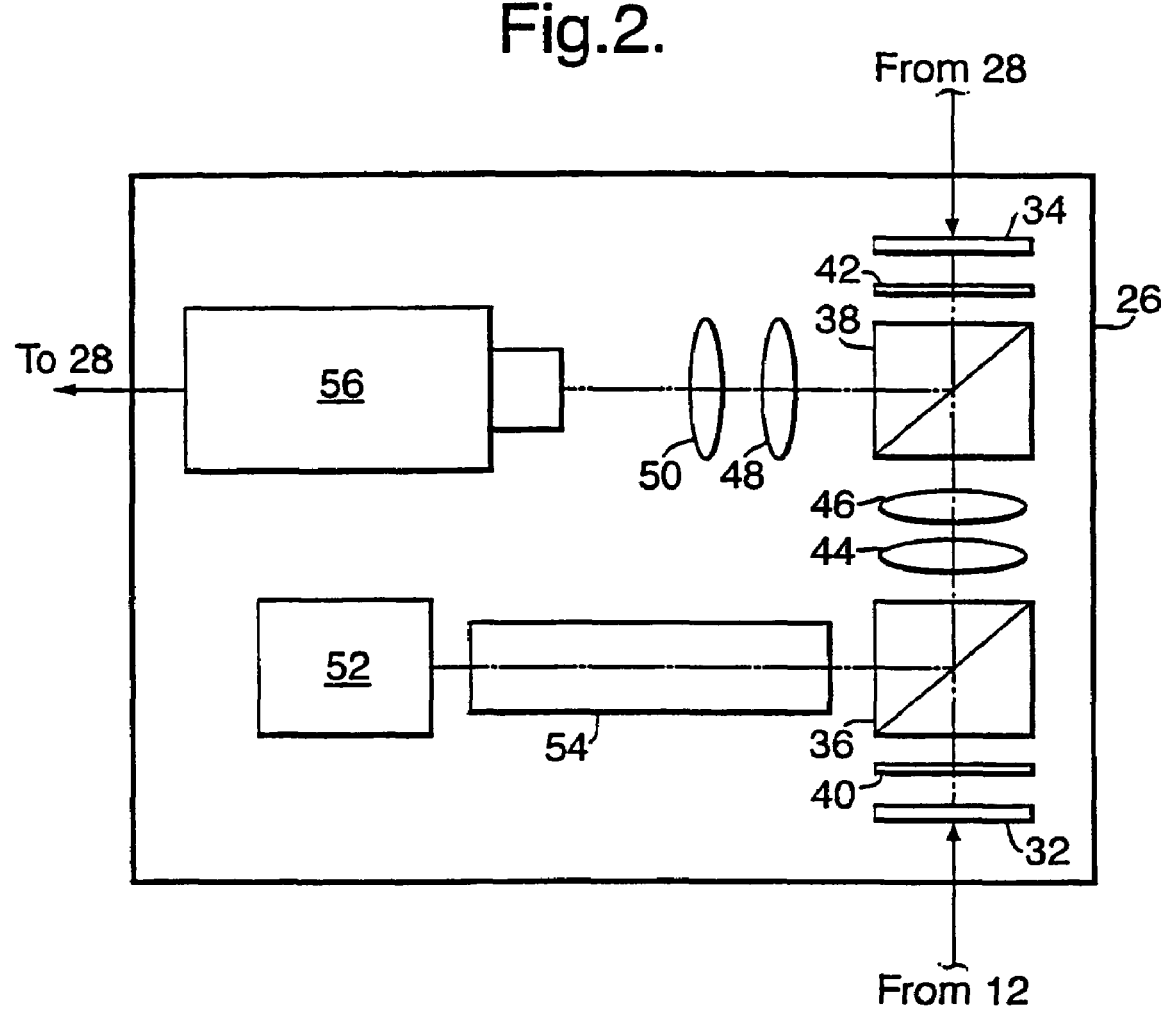
FIG. 2 is a schematic representation of the optical correlator of the head tracker of FIG. 1.

Referring to FIG. 2 there is shown a schematic representation of the optical correlator 26, which is of a known type, often termed a Vander Lugt correlator. As is known the correlator 26 comprises an input spatial light modulator (SLM) 32 for inputting the image captured by the camera 12, a reference SLM 34 for inputting the image with which the first image is to be optically correlated; two polarising beam splitters 36, 38, two half wave plates 40, 42, four Fourier lenses 44, 46, 48, 50, a laser diode 52, a beam expander 54 and a CCD camera 56 for measuring the output of the correlator 26. The operation of optical correlators is well known and accordingly their operation will not be discussed in detail.

In operation the processor 28 has stored images (in the form of a video signal) which are representative of each of the distinguishable markings and it applies each of these sequentially to the reference SLM 34 such that the correlator 26 optically correlates each frame captured by the video camera 12 with an image representative of each of the possible markings. As is known the two SLMs 32, 34 optically encode the video signals onto a coherent collimated laser beam generated by the laser diode 52 and beam expander 54. These coherent optical images are Fourier transformed by the Fourier lenses 44, 46 at their focal (Fourier) plane. Since the images created are coherent with each other, they constructively interfere where they are the same resulting in a set of correlation peaks which are in the form of spots of light whose location indicates where the two images are the same and whose intensity shows how similar the images are. This set of correlation peaks is detected by the CCD camera 56 once they have been reverse transformed by the Fourier lenses 48, 50. The output of the camera 56 is used by the processor 28 to detect when one of the markings passes through the field of view of he camera 12 and hence which marking generator produced it. From this information the processor can determine the orientation of the helmet 2 at the time when the video image was captured. Since a large proportion of the processing is carried out optically the tracker system has an extremely fast dynamic response.

It will be appreciated that since the markings are in the form of a collimated image and the camera is focussed at infinity, a given marking will only be visible to the camera when the axis of the field of view of the camera and the axis of the respective marking are coincident. In order to provide the required accuracy of measurement of the orientation of the helmet it is preferred for the helmet to additionally include movement sensors such as accelerators or gyroscopes to measure the relative movement of the helmet between the known orientations provided by the markings. Alternatively and depending on the application the resolution of the system can be increased by increasing the number of marking generators and/or the number of cameras.

In a further alternative arrangement markings are used which are not in the form of a collimated image such as for example an arrangement of uncollimated light source or physical markings which can be defined spatially and/or by their colour. When using such markings the camera is focussed on the near field. Since such markings will be within the field of view of the camera for possibly some considerable time the optical correlator is operable to not only detect for the presence of the or each marking, but also to determine where it is within the field of view of the camera in order to accurately determine the head mounting orientation. In order to recognise markings when they are off axis the processor is operable to generate skewed images of the markings. As a further alternative to using a plurality of deliberately provided applied markings it is also envisaged to utilise distinguishable features already present in the environment surrounding the user such as the cockpit in the example described. With such an arrangement the optical correlator is operable to optically correlate the scene data captured by the camera with scene data representative of the user's environment from different known orientations e.g. pre-captured features of the cockpit.

In yet a further embodiment the optical correlator is operable to optically correlate the current scene data from the video camera with scene data which was previously captured by the camera to determine the relative movement of the head mounting during the interval between the capture of the data. Such a system eliminates the need for pre-recording, pre-capturing, optical images representative of each marking or representative features of the user's environment from known orientation. In such a system however it is still advantageous to further include one or more intentionally applied distinguishable markings at known fixed locations to initially reference the system and/or update the system during operation. It will be appreciated that, for such a system to continue to track the user's head movement effectively, consecutive optical images which are to be correlated must contain features common to each. In the case of military aircraft the pilot's head movement can be as rapid as two hundred degrees a second and thus with a video camera having a five degree field of view and a frame rate of two hundred and twenty-five frames per second at least five consecutive video images should contain features common to each. To further increase the reliability of the tracker it is preferred to provide one or more additional cameras at different fixed orientation and to correlate the optical images produced by each.

It will be appreciated that the present invention is not restricted to the specific embodiments described and that modifications can be made which are within the scope of the invention. For example the axis of the field of view of the camera is accurately aligned with a known reference axis in the helmet. In one arrangement this axis is set to additionally correspond to the forward looking direction of the pilot such that the video output from the camera is representative of the view seen by the pilot minus the symbology generated by the HMD. The video signal is additionally applied to a video processor where it is combined with the symbology from the HMD symbol generator to form a facsimile of the view seen by the pilot. This composite image is recorded on a video recorder and used after the flight to evaluate the pilot's performance.

For example, in any of the embodiments the video camera can be mounted in the cockpit and the markings and/or marking generators mounted on the helmet. In the case of a system which correlates optical scene data the helmet would additionally include features such as for example a bar code arrangement.

To further increase the dynamic response of any of the systems it is preferred to use two or more cameras, for example one on each side of the helmet with additional optical correlators to correlate the output of the additional cameras with the reference symbols.

Furthermore the number and type of markings can be varied, provided that each is an image which is distinguishable and which can unambiguously identified. Accordingly in yet a further embodiment one or more of the markings can be generated using a head-up display in place of or in addition to the separate marking generators.

In the specific embodiment described the output of the video camera 12, which comprises an electrical video signal, is passed down the umbilical cord 8 to the optical correlator 26, thereby eliminating the need to mount the correlator on the helmet 2. With such an arrangement the processing speed of the system, whilst quick, is currently limited to the frame rate of the camera, that is two hundred and twenty frames per second. In an alternative tracker system the video camera can be dispensed with and the optical image fed directly to the optical correlator via, for example, the umbilical cord 8 which could include one or more optical fibres. To further increase the dynamic response it is also envisaged to provide one or more optical correlators each dedicated to one or two markings such that substantially continuous optical processing can be achieved. It will be further appreciated that other forms of optical correlator can be used such as a joint transform type which has the advantage of only requiring a single spatial light modulator (SLM) onto which the input and reference images can be displayed side by side. Although the tracker system has been described in relation to a fixed wing aircraft it can be applied equally to other vehicles or any application where it is required to track a user's head movement relative to a fixed datum. In summary it is believed the present invention resides in a head tracker system which uses the optical correlation to determine the user's head orientation relative to the fixed datum.

The invention claimed is:

1. A head tracker system for determining a user's head orientation relative to a datum comprising:
   a head mounting for attachment to the user's head;
   an optical sensor located in fixed relation with a known fixed point relative to the head mounting;
   a plurality of distinguishable markings each of which is located in fixed relation with a respective known point which is fixed relative to the datum;
   an optical correlator for optically correlating the optical image from the optical sensor with an optical image representative of at least one of said markings; and
   means for determining the orientation of the head mounting responsive to an output from the optical correlator detecting that there is correlation between the images.

2. A head tracker system according to claim 1 in which the optical correlator is of the joint transform type.

3. A head tracker according to claim 1, wherein said distinguishable marking comprises a spatial pattern.

4. A head tracker system according to claim 1, wherein said distinguishable marking is defined in part at least by the colour of the marking.

5. A head tracker system according to claim 1 and further comprising one or more marking generators for generating the distinguishable markings.

6. A head tracker system according to claim 5 in which the colour of the markings is defined by the wavelength of the light produced by each marking generator.

7. A head tracker according to claim 1 in which each marking is a substantially collimated image having an axis which is predetermined and which passes through said respective known fixed point.

8. A head tracker system according to claim 1 in which the plurality of markings comprises features of the environment around the user.

9. A head tracker system according to claim 1 in which the optical correlator is operable to sequentially, optically correlate the optical image from the optical sensor with an optical image representative of each of the markings.

10. A head tracker system according to claim 1 in which the means for determining the orientation of the head mounting determines the head mounting orientation by determining where within the field of view of the optical sensor a marking is located.

11. A head tracker system according to claim 1 in which the optical sensor comprises a video camera for capturing the optical image and producing an electrical signal representative of it and converting the electrical signal back to an optical image.

12. A head tracker system according to claim 1 and further comprising a second optical sensor located at a second known fixed point relative to the head mounting or to the fixed datum.

13. A head tracker system according to claim 1 in which the optical correlator is a Vander Lugt type correlator.

14. A head tracker system for determining a user's head orientation relative to a datum comprising:
   a head mounting for attachment to the user's head;
   a plurality of distinguishable markings each of which is located in fixed relation with a respective known point which is fixed relative to the head mounting;
   an optical sensor located in fixed relation with a known fixed point relative to the datum;
   an optical correlator for optically correlating the optical image from the optical sensor with an optical image representative of at least one of said markings; and
   means for determining the orientation of the head mounting responsive to an output from the optical correlator detecting that there is correlation between the images.

15. A head tracker system for determining a user's head orientation relative to a datum comprising:
   a head mounting for attachment to the user's head;
   an optical sensor located at a known point fixed relative to the head mounting and operable to collect optical scene data representative of the user's environment;
   an optical correlator for correlating said optical scene data with optical scene data previously captured by said optical sensor to determine the relative movement of the head mounting between the capture of said optical scene data; and
   means for determining the orientation of the head mounting from said relative movements.

16. A head tracker system according to claim 15 wherein the environment comprises at least a part of an aircraft cockpit.

17. A head tracker system according to claim 15 and further comprising providing one or more visibly distinguishable markings at respective known points which are fixed relative to the datum.

* * * * *